(12) United States Patent
Büttner et al.

(10) Patent No.: US 11,522,424 B2
(45) Date of Patent: Dec. 6, 2022

(54) INSULATION OF WINDING ENDS OF A STATOR WINDING

(71) Applicant: Siemens Aktiengesellschaft, Munich (DE)

(72) Inventors: Klaus Büttner, Hollstadt (DE); Tobias Katzenberger, STT Unteressfeld (DE); Klaus Kirchner, Ostheim (DE); Bastian Plochmann, Neustadt an der Aisch (DE); Matthias Warmuth, Windshausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 166 days.

(21) Appl. No.: 16/943,720

(22) Filed: Jul. 30, 2020

(65) Prior Publication Data
US 2021/0036589 A1 Feb. 4, 2021

(30) Foreign Application Priority Data

Aug. 2, 2019 (EP) .................................. 19 18 9800

(51) Int. Cl.
  *H02K 15/10* (2006.01)
  *H02K 1/16* (2006.01)
  *H02K 3/30* (2006.01)
  *H02K 3/48* (2006.01)
  *H02K 3/14* (2006.01)
  (Continued)

(52) U.S. Cl.
  CPC .............. *H02K 15/105* (2013.01); *H02K 1/16* (2013.01); *H02K 3/30* (2013.01); *H02K 3/38* (2013.01); *H02K 3/48* (2013.01); *H02K 15/12* (2013.01); *H02K 3/14* (2013.01); *H02K 2203/06* (2013.01)

(58) Field of Classification Search
  CPC ...... H01B 7/182; H01B 7/183; H01B 7/1865; H01B 13/22; H02K 15/105; H02K 3/30; H02K 3/38; H02K 2203/06; D04H 3/16
  See application file for complete search history.

(56) References Cited

U.S. PATENT DOCUMENTS 5,210,928 A  5/1993 Seshita et al.
6,361,632 B1  3/2002 Emery
(Continued)

FOREIGN PATENT DOCUMENTS

EP  1134876 A1 * 9/2001 .............. H02K 11/25
FR  2939251 A1 * 6/2010 .............. H02K 3/50
JP  2002033213 A  1/2002

*Primary Examiner* — Livius R. Cazan
(74) *Attorney, Agent, or Firm* — Henry M. Feiereisen LLC

(57) ABSTRACT

A stator of an electric machine includes a laminated core having slots for receiving windings of a multiphase winding system. The windings have winding ends, which are encased with an insulator across a partial length. In order to encase the winding ends with the insulator, a strand of a thermoplastic material is extruded onto the winding ends via a nozzle. During extrusion, the nozzle is moved relative to the winding end along the longitudinal extent thereof and an oscillating movement of the nozzle transversely to the longitudinal extent of the winding end overlays the movement along the longitudinal extent. As a result the thermoplastic material lies on the winding end and around the respective winding end in the form of loops.

18 Claims, 6 Drawing Sheets

(51) Int. Cl.
*H02K 3/38* (2006.01)
*H02K 15/12* (2006.01)

(56) References Cited

U.S. PATENT DOCUMENTS

2016/0225487 A1* 8/2016 Koeppendoerfer .. H01B 7/1875
2016/0344269 A1 11/2016 Yabe et al.

* cited by examiner

INSULATION OF WINDING ENDS OF A STATOR WINDING

CROSS-REFERENCES TO RELATED APPLICATIONS

This application claims the priority of European Patent Application, Serial No. 19189800.6, filed Aug. 2, 2019, pursuant to 35 U.S.C. 119(a)-(d), the disclosure of which is incorporated herein by reference in its entirety as if fully set forth herein.

BACKGROUND OF THE INVENTION

The present invention relates to a method for the production of a stator of an electric machine, to such a stator, and to an electric machine which includes such a stator.

The following discussion of related art is provided to assist the reader in understanding the advantages of the invention, and is not to be construed as an admission that this related art is prior art to this invention.

Electric machines are built with a very high number of different designs. For instance, individual manufacturers in the field of low voltage industrial motors often offer more than 1000 different designs. This plurality of different variants often renders a fully-automated production line inefficient. Instead, a high number of electric machines is manufactured on manual workstations. In particular, the winding ends, by way of which during subsequent operation of the electric machine the windings are supplied with electrical energy, often vary in terms of cross-section, length, outlet area on the winding head of the windings and insulation thickness of the individual wires of the respective winding end and also with respect to the number of individual wires. The insulator applied to the respective connection line must be matched to this constellation.

It would therefore be desirable and advantageous to address these prior art problems and to obviate other prior art shortcomings.

SUMMARY OF THE INVENTION

According to one aspect of the present invention, a method of producing a stator of an electric machine, in particular a rotating electric machine, includes introducing slots into a laminated core, introducing windings of a multiphase winding system into the slots, extruding a strand of thermoplastic material via a nozzle onto a winding end of the windings to form an insulator which encases the winding end, while extruding the strand moving the nozzle relative to the winding end along a longitudinal extent thereof, and overlaying a movement of the nozzle along the longitudinal extent with an oscillating movement of the nozzle directed transversely to the longitudinal extent of the winding end and having an oscillation frequency, so that the thermoplastic material lies on the winding end and about the winding end in the form of loops.

In accordance with the present invention, one and the same material can be used, independently of which type of winding end of the insulator which is to be applied.

According to another advantageous feature of the present invention, the movement of the nozzle along the longitudinal extent of the winding end can be composed of a basic movement and an additional movement, with the basic movement being a continuous movement along the longitudinal extent of the winding end with a fixed movement speed, and with the additional movement being a movement which oscillates with an amplitude and an additional frequency, wherein the fixed movement speed is less than four times a product of the amplitude and the additional frequency. Advantageously, the fixed movement speed can be less than the product of the amplitude and the additional frequency. As a result, the winding ends can be easily encased with a completely closed insulation layer.

According to another advantageous feature of the present invention, the oscillation frequency can equate to the additional frequency, and the oscillating movement of the nozzle and the additional movement can be phase offset by 90° relative to one another. As a result, the individual loops can be formed in a particularly simple manner. The parity of the two frequencies and the phase offset of the two movements relative to one another can be achieved for instance in that the nozzle carries out a rotating movement.

According to another advantageous feature of the present invention, the thermoplastic material can be supplied to the nozzle with a working pressure between 1 bar and 10 bar. Tests have shown that this pressure has led to good results, in particular in an optimized exit speed of the strand from the nozzle.

According to another advantageous feature of the present invention, the thermoplastic material can be supplied to the nozzle with a working temperature between 180° C. and 220° C. This temperature range generally brings about a good viscosity of the thermoplastic material, so that good flow properties are provided and the risk of the strand tearing after a specific section of the strand strikes the respective connection line can be avoided.

According to another advantageous feature of the present invention, the thermoplastic material can be a polyolefin or a polyamide.

According to another advantageous feature of the present invention, the strand of thermoplastic material can be extruded in a single work step and from a single direction. Still, complete encasing of the respective winding end can be achieved, i.e. also on the nozzle-distal side of the winding end. Only the amplitude of the oscillating movement of the nozzle transversely to the longitudinal extent of the winding end needs to be selected for the respectively formed loop to be long enough so that after being applied to the winding end the loop extends at least as far as the nozzle-distal side of the winding end.

According to another advantageous feature of the present invention, the winding end can have a number of wires which are twisted to one another before extruding the thermoplastic material. As a result, the cross-section of the winding end can be kept compact.

According to another advantageous feature of the present invention, the strand of thermoplastic material can be extruded fully automatically. Advantageously, the strand of thermoplastic material can be extruded with a robot.

According to another advantageous feature of the present invention, before extruding the thermoplastic material onto the winding end, a location and a course of the winding end can be detected, and the movement of the nozzle along the longitudinal extent of the winding end and the oscillating movement of the nozzle transversely to the longitudinal extend of the winding end can be determined in response to the detected location and the detected course of the winding end. As a result, application of the thermoplastic material onto the winding end can be optimized.

According to another aspect of the present invention, a stator of an electric machine, in particular of a rotating electric machine, includes a laminated core having slots, windings of a multiphase winding system introduced into the slots, each winding having a winding end, and an insulator encasing the winding end of the winding along a partial length thereof, with the insulator being made of thermoplastic material and extruded onto the winding end in the form of a strand such that the strand is applied to the winding end and around the winding end in the form of loops.

According to another advantageous feature of the present invention, the thermoplastic material can be a polyolefin or a polyamide.

According to another advantageous feature of the present invention, the winding end can include a number of wires that are twisted with one another. As a result, the cross-section of the winding end can be kept compact.

According to yet another aspect of the present invention, an electric machine, in particular a rotating electric machine, includes a stator as set forth above.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
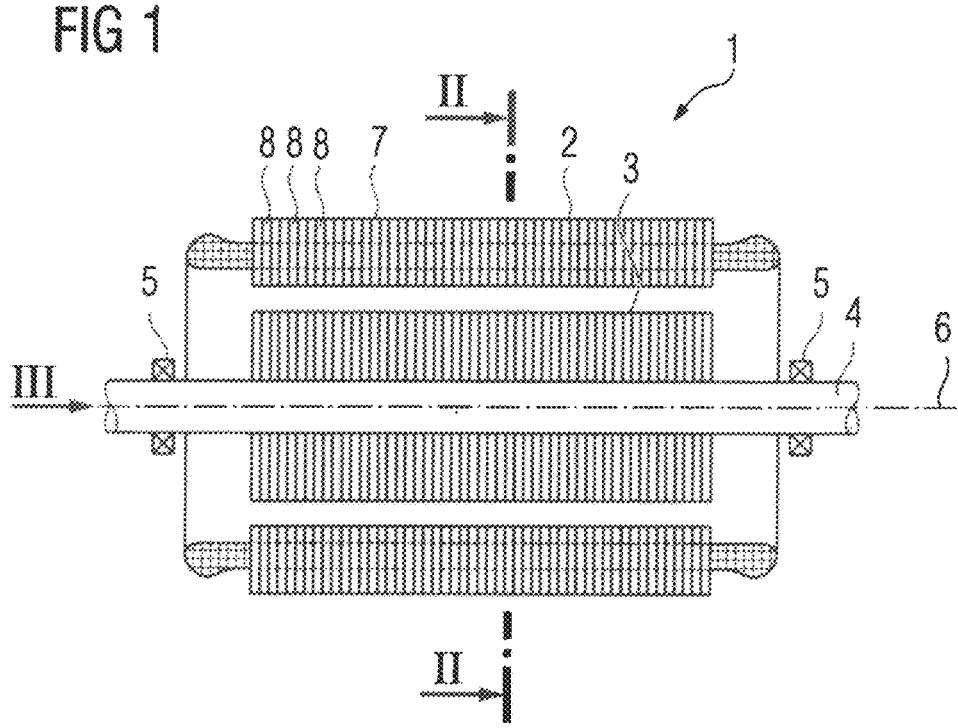
FIG. 1 is a sectional view of an electric machine according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of an electric machine according to the present invention, generally designated by reference numeral 1 and including a stator 2. The electric machine 1 can be embodied as a linear electric machine. Normally, however, the electric machine 1 is configured as a rotating electric machine and therefore also has a rotor 3 in addition to the stator 2. In the case of a rotating electric machine, the rotor 3 is arranged in a rotatable manner on a rotor shaft 4, which for its part is mounted rotatably in bearings 5. As a result, the rotor shaft 4 and the rotor 3 can be rotated about an axis of rotation 6. It will be appreciated by persons skilled in the art that the electric machine 1 contains other components which do not appear in the foregoing Figure, e.g. housing or bearing shields. However, these components, like much other necessary components, are not part of the invention, and have been omitted from the Figures for the sake of simplicity.

Figure 2:
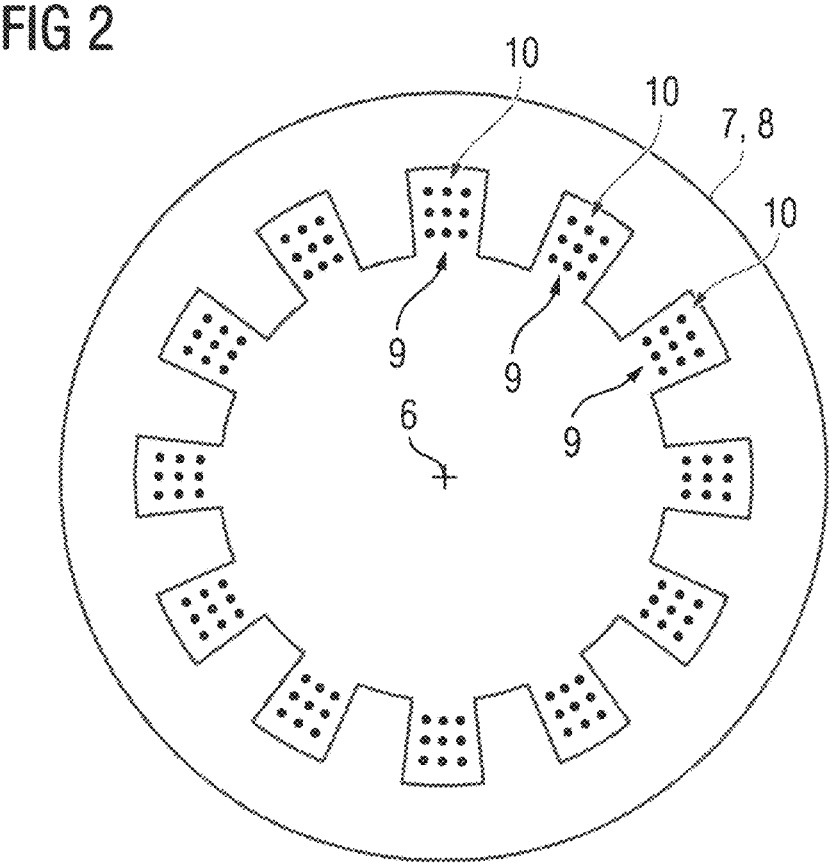
FIG. 2 is a sectional view of the electric machine, taken along the section line II-II in FIG. 1.

The stator 2 has a laminated core 7 with a plurality of individual stator laminations 8. Just a few of the stator laminations 8 in FIG. 1 are provided with their reference character in order not to unnecessarily overload FIG. 1. The laminated core 7 is manufactured in a conventional manner and therefore there is no need to explain it in more detail. FIG. 2 shows a section through the laminated core 7. It can be seen in particular from FIG. 2 that slots 9 are introduced into the laminated core 7. In general the slots 9 can be introduced into the laminated core 7 so that the stator laminations 8 are already stamped accordingly. Only some of the slots 9 in FIG. 2 are provided with their reference character for sake of simplicity.

Windings 10 of a stator winding system are introduced into the slots 9. The windings 10 form a multiphase stator winding system. The windings 10 of the individual phases are generally introduced sequentially consecutively into the slots 9. The insertion of the windings 10 as such is carried out in a conventional manner and therefore need not be explained in more detail. The windings 10 can, if necessary, be embodied as so-called random windings or as so-called laid windings.

Figure 3:
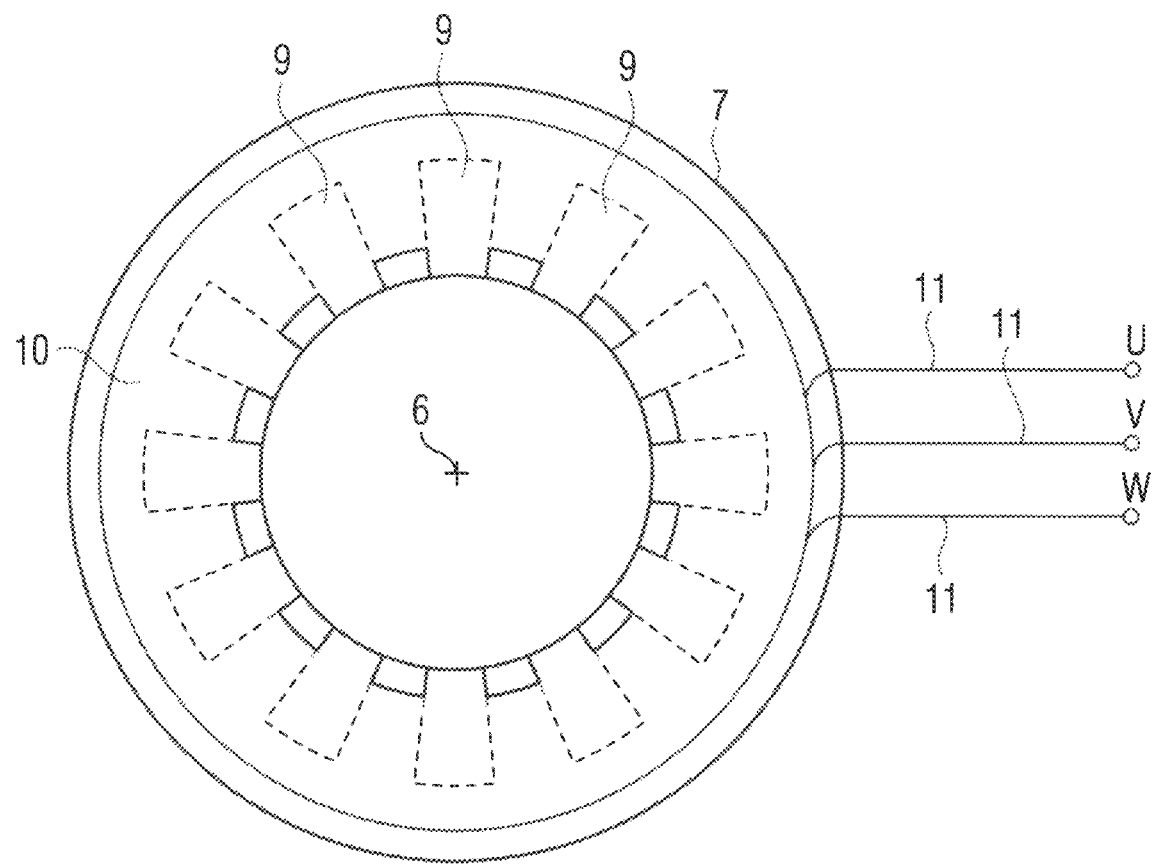
FIG. 3 is a top view onto a winding head of the electric machine in FIG. 1, as viewed in a direction marked III.

FIG. 3 shows one of the two winding heads of the electric machine 1. According to FIG. 3, the windings 10 in the region of at least one of the two winding heads, in most instances only in the region of a single one of the two winding heads, have winding ends 11. The winding ends 11 are used to apply supply voltages, for instance supply voltages U, V, W of a three-phase system, to the windings 10 during operation of the electric machine 1.

Figure 4:
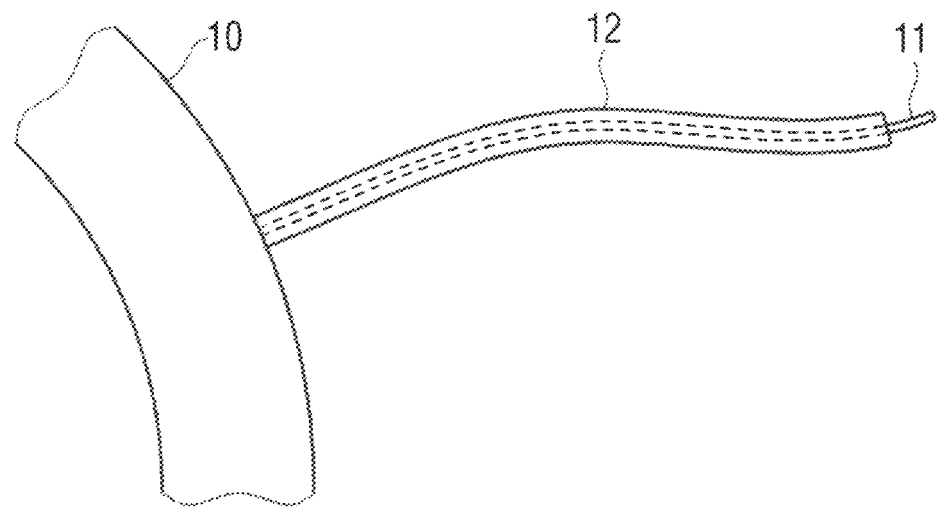
FIG. 4 is a schematic cutaway view of a single winding end with an insulator.

The winding ends 11 have an insulating coating in the form of an insulating varnish, which, however, is not shown here in greater detail. This insulating coating can easily become damaged as the winding ends 11 are handled. For reasons of electric voltage tolerance and operational safety, the winding ends 11 are therefore encased with an insulator 12 as shown in FIG. 4. The insulator 12 is made of a thermoplastic material. Examples of suitable materials include in particular polyolefin and polyamide. Practice has shown good results when using materials 3M Scotch Weld 3731, 3789 and 3779 by the company 3M, with the first listed material being a polyolefin and the two other materials being polyamide.

The insulator 12 is encased, as shown by way of example in FIG. 4 for one of the winding ends 11, only across a partial length of the winding end 11. The encasing with the insulator 12 is generally implemented starting at the corresponding winding head and ends shy of the end of the winding end 11. Connection of a corresponding supply voltage U, V, W to the unencased end of the winding end 11 then takes place in a terminal box of the electric machine 1. Application of the insulator 12 to the winding end 11 will be explained in more detail hereinafter.

Figure 5:
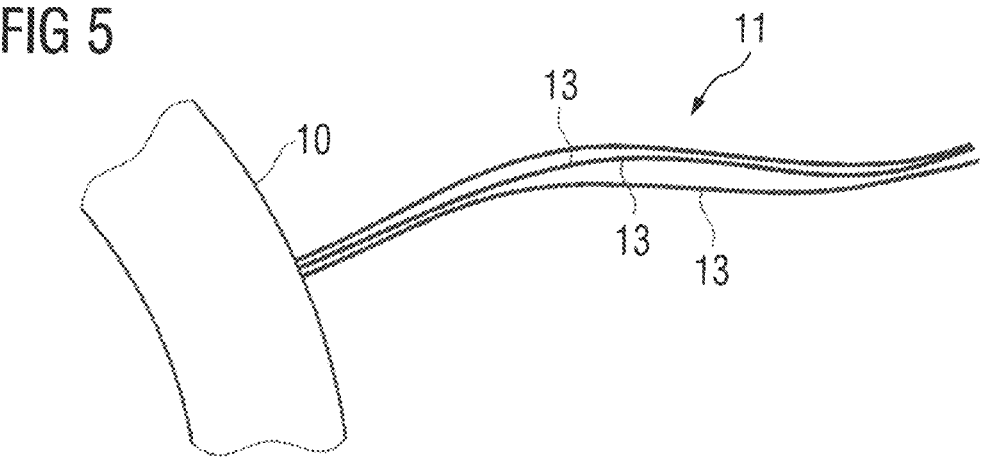
FIG. 5 is a schematic illustration of the winding end of FIG. 4 before applying the insulator, depicting wires of the winding end.
Figure 6:
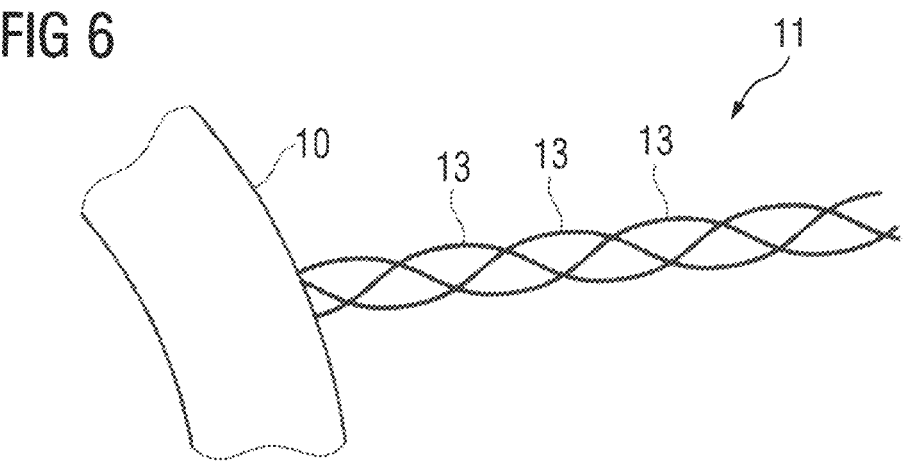
FIG. 6 is a schematic illustration of the winding end of FIG. 4 with the wires being twisted in relation to one another.

Each of the winding ends 11 generally includes a number of wires 13 as shown in FIG. 5. The wires 13 are initially twisted with one another according to the representation in FIG. 6. In some cases, twisting of the wires 13 may also be omitted. The following description assumes however that the wires 13 are twisted with one another.

Figure 7:
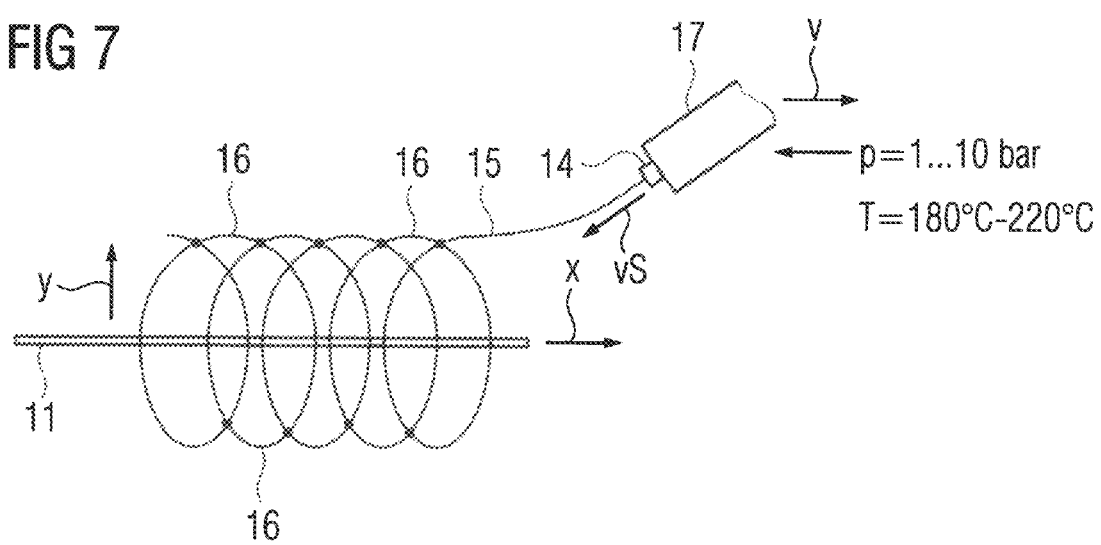
FIG. 7 is a schematic illustration during application of the insulator onto the winding end in FIG. 6.

After twisting, the corresponding winding end 11 is encased with the insulator 12. For this purpose, according to the representation in FIG. 7, a strand 15 is extruded onto the winding end 11 by a nozzle 14. The associated thermoplastic material is fed to the nozzle 14 for this purpose with a pressure p and a working temperature T. The pressure p generally ranges between 1 bar and 10 bar. The working temperature T generally ranges between 180° C. and 220° C. If the thermoplastic material has a defined melting temperature, the melting temperature accordingly lies below the working temperature T. If the thermoplastic material has no defined melting temperature, the corresponding situation applies to the glass transition temperature of the thermoplastic material. The melting temperature or the glass transition temperature should advantageously lie at at least 110° C. A higher melting temperature or glass transition temperature of 150° C. and more, in particular of up to 180° C. and partially even up to 200° C., is also possible.

The strand 15 exits the nozzle 14 at a speed vS. During extrusion of the strand 15, the nozzle 14 is moved along the longitudinal extent x of the winding end 11 relative to the winding end 11. An oscillating movement of the nozzle 14 transversely to the longitudinal extent x of the winding end 11 overlays this movement along the longitudinal extent x. The oscillating movement of the nozzle 14 transversely to the longitudinal extent x has an oscillation frequency f. The oscillating movement of the nozzle 14 transversely to the longitudinal extent x is further determined such that the strand 15 has an amplitude Ay in a transverse direction y. The amplitude Ay is determined according to FIGS. 7 and 8 such that the strand 15, i.e. the thermoplastic material which the finished insulator 12 is made of, lies on the winding end 11 and around the winding end 11 in the form of loops 16.

Figure 8:
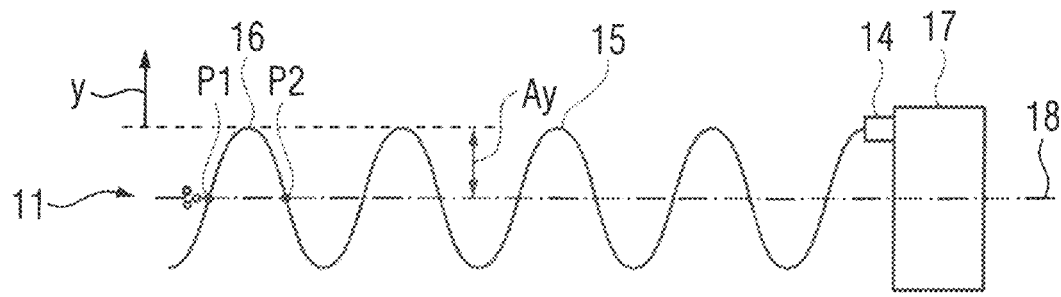
FIGS. 8 to 10 are schematic illustrations of various stages during application of an individual loop of the insulator onto the winding end of FIG. 6.
Figure 9:
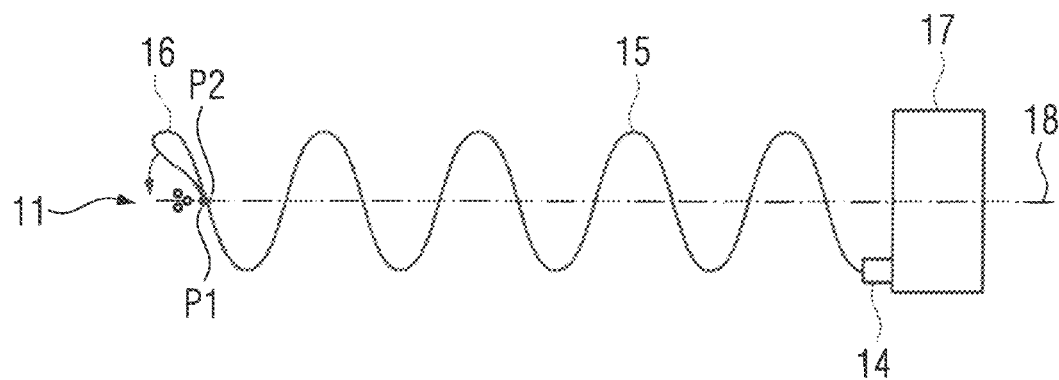
Figure 10:
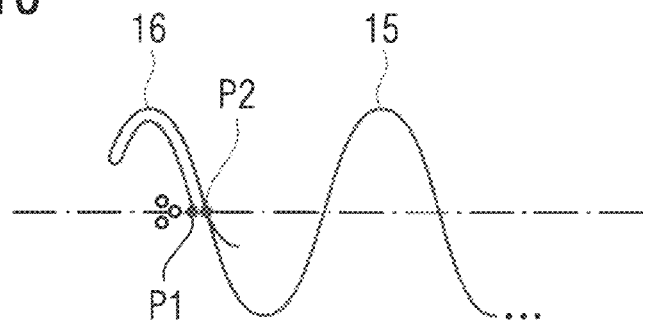

FIGS. 8 to 10 show, by way of example, two points P1, P2 of the strand 15, which form a single loop 16 between themselves and how this loop 16 lies on the winding end 11 and around the winding end 11. Initially, according to FIG. 8, point P1 of the strand 15 strikes the winding end 11. The strand 15 is then moved in the transverse direction y away from the winding end 11 until it reaches its maximum deflection in the transverse direction y. When the strand 15 traverses the winding end 11 again, according to FIG. 9 point P2 of the strand 15 strikes the winding end 11. The loop 16 between the two points P1, P2 is formed as a result. The fact that the two points P1, P2 are already fixed to the winding end 11 and the loop 16 oscillates means that this loop 16 then lies around the winding end 11 in accordance with the representation in FIG. 10. The process then repeats on the other side so that a respective loop 16 lies on the winding end 11 and around the winding end 11 alternately from the left and right.

Figure 11:
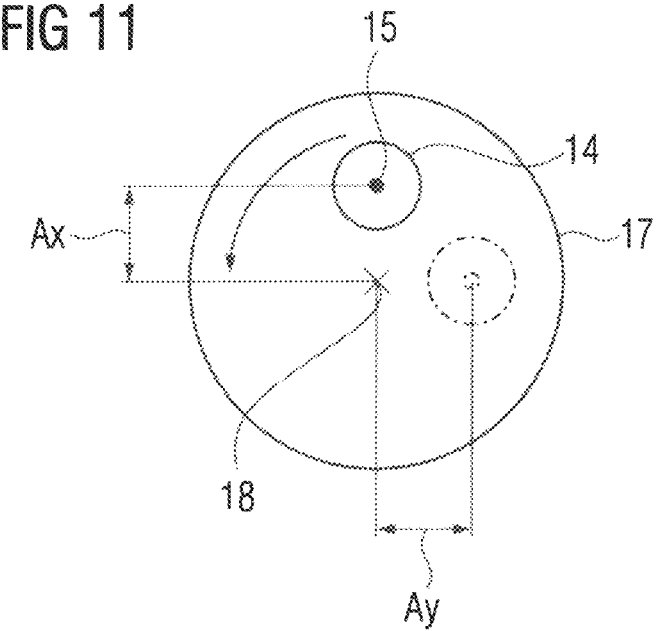
FIG. 11 is a schematic illustration of a nozzle head.

It is possible for the movement of the nozzle 14 to be implemented with a constant movement speed v along the longitudinal extent x of the winding end 11. The movement of the nozzle 14 along the longitudinal extent x of the winding end 11 is advantageously composed of a basic movement and an additional movement. The basic movement is a continuous movement along the longitudinal extent x of the winding end 11 with the fixed (=constant) movement speed v. The additional movement is a movement which oscillates with an amplitude Ax and an additional frequency fZ. For instance, according to the representation in FIG. 11, the nozzle 14 can be arranged on a nozzle head 17 and can rotate there with a specific rotational speed about an axis of rotation 18. In this case, the oscillation frequency f equates to the additional frequency fZ. Furthermore, the oscillating movement of the nozzle 14, i.e. the movement of the strand 15 in the transverse direction y, and the additional movement are phase offset about 90° relative to one another. At those time instants at which the additional movement reaches its reversal points, the strand 15 is therefore moved in the transverse direction y with a maximum speed and vice versa. Structure and operation of such nozzle heads 17 are known to persons skilled in the art, e.g. those that are produced and marketed by the company Nordsen. It is also possible, however, to realize the two movements independently of one another. In this case, both the amplitudes Ax, Ay and also the frequencies fZ, f can be selected independently of one another.

The fixed movement speed v is advantageously smaller than four times the product of the amplitude Ax and the additional frequency fZ. Advantageously, v<4AxfZ applies. As a result, consecutive loops 16 overlap one another in the longitudinal extent x of the winding end 11. The fixed movement speed v may advantageously be even lower than the product of the amplitude Ax and the additional frequency fZ, in which case v<AxfZ applies. As a result, viewed in the longitudinal direction x of the winding end 11, a complete coverage of the winding end 11 is achieved reliably. Thus, the insulator 12 includes a number of overlayed strands.

Figure 12:
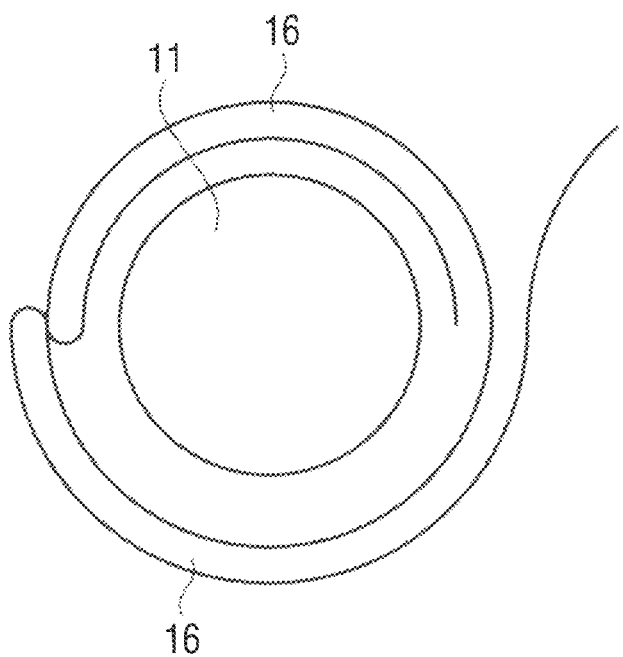
FIG. 12 is a schematic illustration of two loops applied to a winding end successively immediately one after the other.

When the movement of the nozzle 14 in the direction of the longitudinal extent x and the oscillation frequency f and the amplitude Ay are suitably matched to one another, it is sufficient to extrude the thermoplastic material onto the winding end 11 in a single work step and from a single direction. As is readily apparent from FIG. 12, a complete coverage of the winding end 11 can still be established in a peripheral direction about the winding end 11.

A layer thickness of the insulator 12 may, optionally, be adjusted. Normally, the layer thickness of the insulator 12 ranges between 0.1 mm and 1.0 mm. In some cases, deviations from these values are possible, however.

Figure 13:
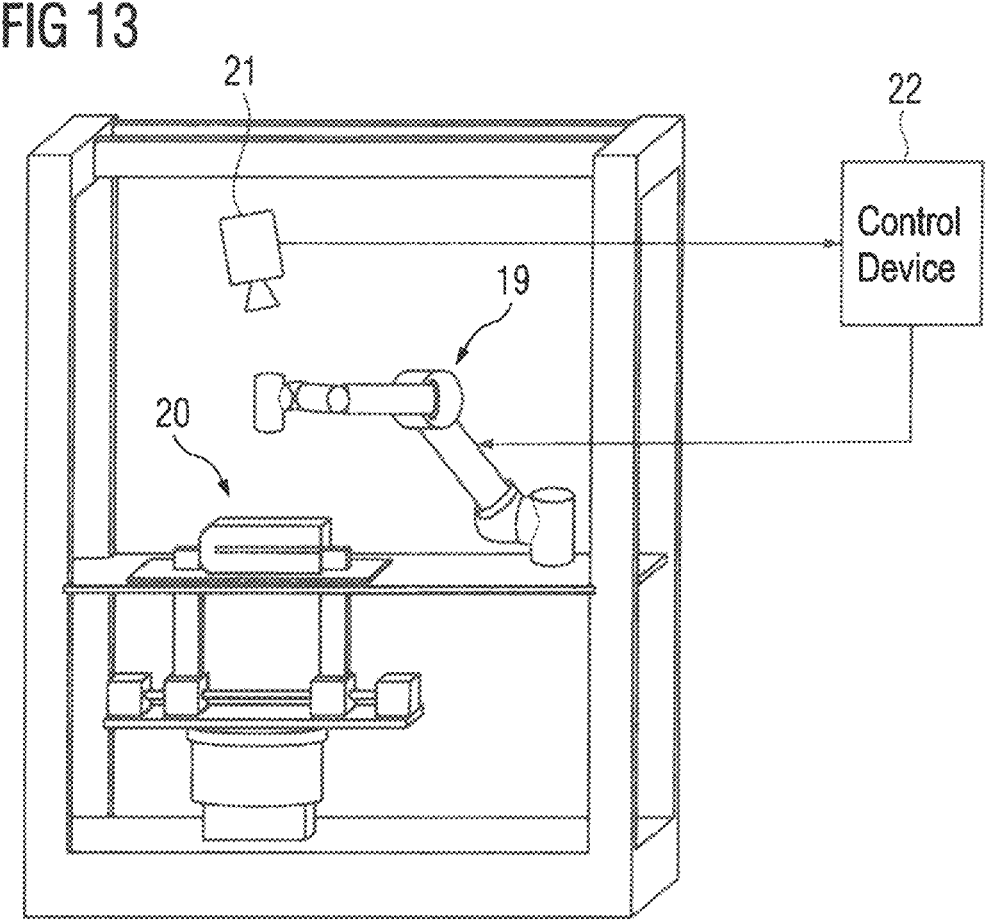
FIG. 13 is a perspective view of a manufacturing device.

As a result of the novel way of applying the insulator 12 to the winding ends 11, it is possible for the thermoplastic material to be extruded fully automatically. For instance, according to the representation in FIG. 13, a corresponding manufacturing device can have a robot 19 for executing the extrusion process. Depending on the manner of fixing the stator 2 in a holding device 20 of the manufacturing device, it is possible for the winding ends 11 to be located at defined locations. Alternatively, it is possible for the manufacturing device to have an optical detection system 21, by which the location and the course of the winding ends 11 are detected before extruding the thermoplastic material onto the winding ends 11. The optical detection system 21 can be embodied as a 3D camera, for instance. In the case of an optical detection, the detected location and the detected course of the winding ends 11 can be fed to a control device 22. The control device 22 is able to correspondingly take into account the detected location and the detected course of the winding ends 11 when the nozzle 14 is moved along the longitudinal extent x of the winding end 11 and when the nozzle 14 moves in an oscillating manner transversely to the longitudinal extent x of the winding end 11.

Figure 14:
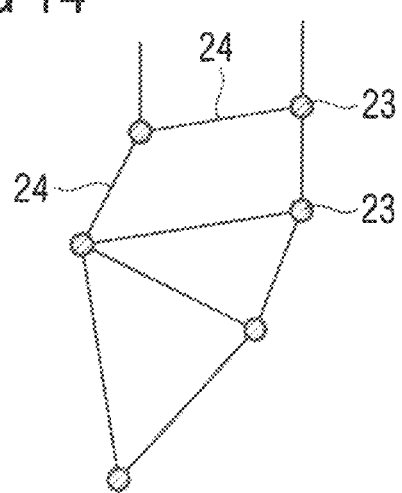
FIG. 14 is a cutaway view of an insulator.

Optionally, the insulator 12 can be embodied as a completely closed structure or as a network-type structure. In the latter case, according to the representation in FIG. 14, the insulator 12 forms a planar, fused grid which has a plurality of nodal points 23 and a plurality of rod-type connections 24. The rod-type connections 24 are those regions of the grid which are unbranched. The nodal points 23 are those regions of the grid from which at least three rod-type connections 24 extend out. Only few of the nodal points 23 and the rod-type connections 24 are provided with their reference characters in FIG. 14 for sake of simplicity.

Within the scope of applying the loops 16 to the winding ends 11, many parameters can be varied. In addition to the material of the insulator 12, these are for instance the diameter of the strand 15, the amplitudes $A_x$, $A_y$, the frequencies f, fZ, the pressure p, the working temperature T, the distance between the nozzle 14 and the respective winding end 11, the speed v and much more. According to a specific test, an adhesive based on polyolefin has been used with a melting temperature of approx. 200° C. The adhesive has been extruded onto the winding ends 11 with a working temperature T of 220° C. and a pressure p of 3 bar. The adhesive has exited the nozzle 14 at a speed vS of approx. 5 m/s. The distance between the nozzle 14 and the respective winding end 11 amounted to approx. 8 cm, the rotational speed of the nozzle 14 was at 600 U/min. The translational speed v of the nozzle head 17 amounted to 3 cm/s. The loops 16 adhered very well to the winding ends 11 and resulted in complete coverage of the winding ends 11.

In summary, the present invention therefore relates to the following facts:

A stator 2 of an electric machine 1, in particular a rotating electric machine, has a laminated core 7. Slots 9 are introduced into the laminated core 7. Windings 10 of a multiphase winding system are introduced into the slots 9. The windings 10 have winding ends 11, which are encased across a partial length with an insulator 12. In order to encase the winding ends 11 with the insulator 12, a strand 15 of a thermoplastic material is extruded onto the winding ends 11 via a nozzle 14. During extrusion, the nozzle 14 is moved relative to the respective winding end 11 along the longitudinal extent x of the winding end 11. An oscillating movement of the nozzle 14 transversely to the longitudinal extent x of the respective winding end 11 overlays the movement along the longitudinal extent x. As a result, the thermoplastic material lies on the winding end 11 and around the winding end 11 in the form of loops 16.

The present invention has many advantages. The manufacturing process can be carried out fully automatically, for instance. The insulator 12 also has very good adhesion to the winding end 11. On its outside, i.e. the side facing away from the winding end 11, the insulator 12 has cooled within a few seconds after being applied to the winding end 11 and is thus non-adhesive. One and the same thermoplastic material can be used. Actuation of the manufacturing device can generally also take place uniformly. Costs can be reduced. Human errors can be effectively ruled out. The clock cycle, i.e. the time which is required to apply an individual insulation 12, can be reduced.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of producing a stator of an electric machine, in particular a rotating electric machine, said method comprising:
    introducing slots into a laminated core;
    introducing windings of a multiphase winding system into the slots;
    extruding a strand of thermoplastic material via a nozzle onto a winding end of the windings to form an insulator which encases the winding end;
    while extruding the strand, moving the nozzle relative to the winding end along a longitudinal extent thereof; and
    overlaying a movement of the nozzle along the longitudinal extent with an oscillating movement of the nozzle directed transversely to the longitudinal extent of the winding end and having an oscillation frequency so that the thermoplastic material lies on the winding end and about the winding end in the form of loops.

2. The method of claim 1, wherein the movement of the nozzle along the longitudinal extent of the winding end is composed of a basic movement and an additional movement, with the basic movement being a continuous movement along the longitudinal extent of the winding end with a fixed movement speed, and with the additional movement being a movement which oscillates with an amplitude and an additional frequency, wherein the fixed movement speed is less than four times a product of the amplitude and the additional frequency.

3. The method of claim 2, wherein the fixed movement speed is less than the product of the amplitude and the additional frequency.

4. The method of claim 2, wherein the oscillation frequency equates to the additional frequency, and further comprising phase offsetting the oscillating movement of the nozzle and the additional movement by 90° relative to one another.

5. The method of claim 1, further comprising supplying the thermoplastic material to the nozzle with a working pressure between 1 bar and 10 bar.

6. The method of claim 1, further comprising supplying the thermoplastic material to the nozzle with a working temperature between 180° C. and 220° C.

7. The method of claim 1, wherein the thermoplastic material is a polyolefin or a polyamide.

8. The method of claim 1, wherein the strand of thermoplastic material is extruded in a single work step and from a single direction.

9. The method of claim 1, wherein the winding end has a number of wires which are twisted to one another before extruding the thermoplastic material.

10. The method of claim 1, wherein the strand of thermoplastic material is extruded fully automatically.

11. The method of claim 10, wherein the strand of thermoplastic material is extruded with a robot.

12. The method of claim 10, further comprising:
    detecting, before extruding the thermoplastic material onto the winding end, a location and a course of the winding end; and
    determining the movement of the nozzle along the longitudinal extent of the winding end and the oscillating movement of the nozzle transversely to the longitudinal extend of the winding end in response to the detected location and the detected course of the winding end.

13. A stator of an electric machine, in particular of a rotating electric machine, said stator comprising:
a laminated core having slots;
windings of a multiphase winding system introduced into the slots, each said winding having a winding end; and
an insulator encasing the winding end of the winding along a partial length thereof, said insulator being made of a strand of thermoplastic material and extruded via a nozzle, said nozzle moving, while extruding the strand of thermoplastic material, relative to the winding end along a longitudinal extent thereof, and overlaying a movement of the nozzle along the longitudinal extent with an oscillating movement of the nozzle directed transversely to the longitudinal extent of the winding end and having an oscillation frequency so that the thermoplastic material lies on the winding end such that the strand of thermoplastic material is applied to the winding end and around the winding end in the form of loops.

14. The stator of claim 13, wherein the thermoplastic material is a polyolefin or a polyimide.

15. The stator of claim 13, wherein the winding end includes a number of wires that are twisted with one another.

16. An electric machine, in particular a rotating electric machine, said electric machine comprising a stator which includes a laminated core having slots, windings of a multiphase winding system introduced into the slots, each said winding having a winding end, and an insulator encasing the winding end of the windings along a partial length thereof, said insulator being made of a strand of thermoplastic material and extruded via a nozzle said nozzle moving, while extruding the strand of thermoplastic material, relative to the winding end along a longitudinal extent thereof, and overlaying a movement of the nozzle along the longitudinal extent with an oscillating movement of the nozzle directed transversely to the longitudinal extent of the winding end and having an oscillation frequency that the thermoplastic material lies on the winding end such that the strand is applied to the winding end and around the winding end in the form of loops.

17. The electric machine of claim 16, wherein the thermoplastic material is a polyolefin or a polyimide.

18. The electric machine of claim 16, wherein the winding end includes a number of wires that are twisted with one another.

* * * * *

UNITED STATES PATENT AND TRADEMARK OFFICE
CERTIFICATE OF CORRECTION

PATENT NO. : 11,522,424 B2  
APPLICATION NO. : 16/943720  
DATED : December 6, 2022  
INVENTOR(S) : Klaus Büttner et al.

Page 1 of 1

It is certified that error appears in the above-identified patent and that said Letters Patent is hereby corrected as shown below:

On the Title Page

Item (72) Inventors second Inventor's city of residence of Tobias Katzenberger:
Replace "STT Unteressfeld" with -- Bad Königshofen, STT Unteressfeld --.

Item (30) Foreign Application Priority Data:
Replace "EP19 89800" with the correct -- EP19189800.6 --.

In the Claims

In Column 10, Claim 16, Line 8:
Add a "," after -- via a nozzle --.

Signed and Sealed this  
Twenty-fourth Day of January, 2023

Katherine Kelly Vidal  
*Director of the United States Patent and Trademark Office*